V. C. HAMISTER.
ELECTROPLATING CARBON ARTICLES.
APPLICATION FILED JAN. 31, 1920.

1,403,903.

Patented Jan. 17, 1922.

Inventor
Victor C. Hamister

By
Attorneys

UNITED STATES PATENT OFFICE.

VICTOR C. HAMISTER, OF CLEVELAND, OHIO, ASSIGNOR TO NATIONAL CARBON COMPANY, INC., A CORPORATION OF NEW YORK.

ELECTROPLATING CARBON ARTICLES.

1,403,903. Specification of Letters Patent. Patented Jan. 17, 1922.

Application filed January 31, 1920. Serial No. 355,374.

*To all whom it may concern:*

Be it known that I, VICTOR C. HAMISTER, a citizen of United States, residing at Cleveland, in the county of Cuyahoga and State of Ohio, have invented certain new and useful Improvements in Electroplating Carbon Articles, of which the following is a specification.

This invention relates to the electroplating with metal of the walls of holes or recesses in carbon brushes or the like, to permit a good electrical connection to be made with the carbon.

The object of the invention is to provide a method whereby the walls of a hole or recess may be covered with a uniform, coherent coating of metal without the production of any substantial amount of deposit on the exterior of the brush or the like, adjacent to the hole or recess, where its presence would be unnecessary or undesirable. A further object is to make possible the use of high current densities in such a method in order that the plating may be rapidly completed.

These objects are attained by connecting as cathode the brush or the like containing the hole or recess, inserting an anode into the hole or recess, and creating a current of electrolyte within the hole or recess and along its walls, so that polarization of the electrodes and depletion of the electrolyte are prevented, even when currents of high density are employed.

The method will be described in connection with certain arrangements of apparatus for carrying the same into effect, but it will be understood that the method is not dependent upon any specific form of apparatus and modifications of the forms shown herein will readily suggest themselves. In the accompanying drawings, which diagrammatically show apparatus suitable for plating the walls of the different forms of holes and recesses commonly employed in brushes and like carbon articles;

Figure 1:
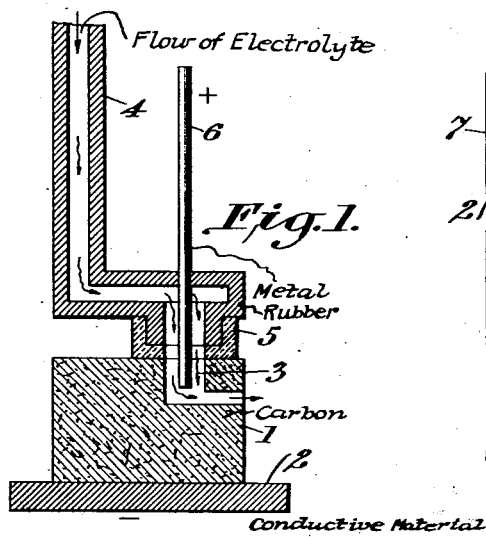
Fig. 1 shows in section an arrangement which may be used where a passage turns within a brush, so that its ends lie in adjacent faces of the brush.

As shown in Fig. 1, the brush or the like 1 is placed upon a plate of conducting material 2 which is connected as cathode. Electrolyte is fed to the recess 3 in the brush by a conduit 4 which may be of insulating material, such as hard rubber. A tight joint between conduit 4 and brush 1 is produced by the soft rubber gasket 5. An anode 6 projects into the recess 3. The electrolyte flows freely from the recess and is again circulated through the recess, after being replenished with metal salt or purified if necessary.

Figure 2:
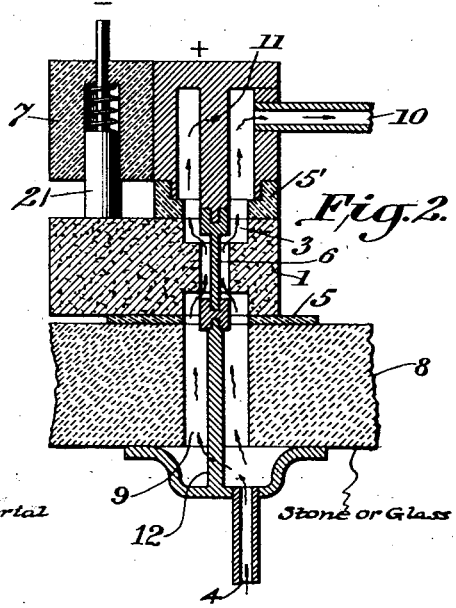
Fig. 2 shows an arrangement which may be used where a passage extends directly through a brush and has sections of different diameters.

In the form shown in Fig. 2, the brush or the like has a passage 3 extending entirely through it. The electrical connection to the brush is effected by means of a spring-pressed plunger 2′ operating in a cavity in a block of insulating material 7 while the effective portion of the anode consists of a conductor 6, conforming to the restricted and expanded portions of the cavity. The brush is shown as supported on a slab 8 of stone or glass having a passage 9 registering with passage 3 in the brush. The electrolyte is admitted at 4 and escapes at 10, tight joints between the brush and abutting members being secured by use of the gaskets 5 and 5′. When an anode of the metal to be plated is used, it must of course be replaceable and is here shown as fitting on extensions on the ends of pins 11 and 12, of which the former must be of conducting material. The anode may be replaced or the brush removed when the plating is finished by simply lifting off the parts above the brush. The anode may of course be made in more than one piece as shown so that it may have some portions larger than the smallest parts of the passage in the brush.

Figure 3:
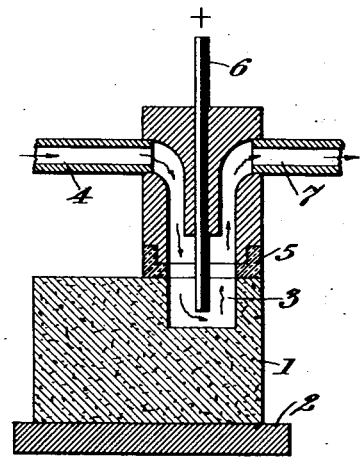
Fig. 3 shows an arrangement for plating the walls of a depression in a brush.

In Fig. 3, in which the recess to be plated is a simple depression, the brush 1 is placed on the conducting plate 2 and the electrolyte conduit is connected with the depression 3 by means of the gasket 5, as in Fig. 1. The anode is supported in the electrolyte-feeding structure as also shown in Fig. 1. A conduit 7 for the escape of the electrolyte is provided.

Figure 4:
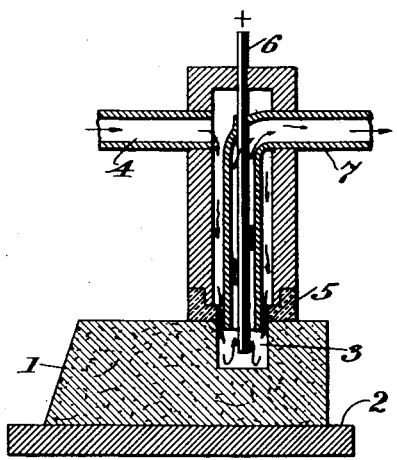
Fig. 4 shows another arrangement, designed to produce a more effective circulation, where the recess to receive the plate is a simple depression.

Fig. 4 represents a modification of the arrangement shown in Fig. 3, an extension of one of the electrolyte conduits, here shown as the off-flow, being brought into proximity to the depression to be plated to insure an effective circulation of electrolyte along its walls.

In any of the arrangements shown above the anode may be formed of the metal to be plated, usually copper, and can be readily replaced when corroded to such extent as to lose its efficiency. The use of insoluble anodes is also within the scope of my invention. The electrolyte escaping from the hole or recess is collected and returned to the operation. When using soluble anodes replenishment of the electrolyte in metal-content may be desirable, while when insoluble anodes are used it is of course indispensible.

The current of electrolyte through the recess or hole to be plated has sufficient velocity to ensure depolarization and to prevent depletion of the electrolyte in contact with the brush. This permits the use of high current density and very rapid plating. The rate of flow of the electrolyte may be controlled to maintain the desired level.

The following specific example will serve to illustrate the process. One form of brush is approximately cubical in shape and has a hole 0.34 in. in diameter and 0.39 in. deep formed in one side, perpendicular to the surface and 0.18 in. from the nearest edge. A smaller hole, 0.18 in. in diameter leads from the side of the larger hole to the nearest face, the arrangement being as indicated in Fig. 1. In plating the walls of the holes in such a brush, electrolyte was passed through the opening at the rate of one quart per minute and current was passed through the flowing electrolyte to the brush as cathode for one minute. The potential employed was two volts and the current was about two amperes. At the end of one minute, the walls of the hole or recess were sufficiently plated, the weight of metal deposited being about 0.002 grams. The electrolyte employed had a density of 19°Bé (specific gravity 1.15) at 15°C, and contained approximately 200 g. of crystallized copper sulfate and 20 g. of sulfuric acid per liter.

Claims:

1. The herein described method of applying a local coating of electrodeposited metal to the walls of a hole or recess in a carbon brush or similar carbon article, comprising actively maintaining a continuous rapid flow of metal-bearing solution along the walls of said hole or recess, and simultaneously passing an electric current to said walls as cathode from an anode having an active surface located within the hole or recess, whereby deposition of the metal except on the walls of the hole or recess is substantially prevented.

2. The method according to claim 1, in which the hole extends through the body of the brush.

3. The method according to claim 2, in which the hole extends through the body of the brush, and the electrolyte is caused to flow downwardly therethrough, the rate of flow of the electrolyte being controlled to maintain the desired level within the hole.

In testimony whereof, I affix my signature.

VICTOR C. HAMISTER.